United States Patent
Chen et al.

(10) Patent No.: US 7,628,445 B2
(45) Date of Patent: Dec. 8, 2009

(54) STRIKER REINFORCEMENT FOR HYDROFORMED AUTOMOTIVE DOOR FRAME

(75) Inventors: Xiaoming N Chen, Canton, MI (US); David Anthony Wagner, Northville, MI (US); Lou Ratsos, Commerce Township, MI (US); Daniel J Szalay, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 11/774,503

(22) Filed: Jul. 6, 2007

(65) Prior Publication Data

US 2009/0008965 A1    Jan. 8, 2009

(51) Int. Cl.
*B60J 7/00* (2006.01)
(52) U.S. Cl. .................................. 296/193.06
(58) Field of Classification Search ............ 296/193.06, 296/203.01, 146.6, 205, 146.1, 146.5
See application file for complete search history.

(56) References Cited

U.S. PATENT DOCUMENTS

| | | | | |
|---|---|---|---|---|
| 4,323,271 A | * | 4/1982 | Taniguchi | 292/341.18 |
| 4,432,575 A | * | 2/1984 | Garvey et al. | 292/341.18 |
| 5,713,501 A | * | 2/1998 | Yokoyama et al. | 224/517 |
| 5,752,728 A | * | 5/1998 | Matouschek | 292/340 |
| 6,129,410 A | | 10/2000 | Kosaraju | 296/188 |
| 6,814,401 B2 | * | 11/2004 | Takada | 296/202 |
| 2004/0042869 A1 | | 3/2004 | Tucker | 411/172 |
| 2004/0119300 A1 | * | 6/2004 | Strable et al. | 292/341.18 |
| 2008/0217932 A1 | * | 9/2008 | Yamada | 292/340 |

* cited by examiner

*Primary Examiner*—Kiran B. Patel
(74) *Attorney, Agent, or Firm*—Frederick Owens; Miller Law Group, PLLC

(57) ABSTRACT

A striker reinforcement plate is configured for installation into the interior of a closed section, hydroformed tubular automotive frame member. The striker reinforcement plate is formed with an enlarged mounting tab at one end and a weld tab at the opposing end. The striker reinforcement plate is inserted through a slot formed into the wall of the tubular frame member, against which the enlarged mounting tab prevents the striker reinforcement plate from falling through the slot, and the weld tab is inserted through a special formed opening to receive the weld tab. The weld tab can then be welded to the exterior surface of the tubular frame member, which combined with the enlarged mounting tab secured against the slot holds the striker reinforcement plate in place for final assembly of the striker. The striker can then be bolted to the reinforcement plate and be positionally adjusted in a conventional manner.

8 Claims, 7 Drawing Sheets

STRIKER REINFORCEMENT FOR HYDROFORMED AUTOMOTIVE DOOR FRAME

FIELD OF THE INVENTION

This invention relates generally to a side door assembly in an automotive vehicle and, more particularly, to a striker reinforcement that is compatible for use with hydroformed tubular door frame members.

BACKGROUND OF THE INVENTION

Forming the frame of an automobile from hydroformed, closed section, tubular members provides an automotive body structure that improves both roof strength and side impact intrusion resistance as compared to conventional spot welded, stamped, open section frame members. Open section frame members, however, did not impede the use of structural reinforcements where needed on the inside portion of the frame member to carry specific loads. Closed section, hydroformed tubular frame members cause difficulties with respect to the attachment of reinforcements that need to be placed on the inside portion of the frame member as internal access into the tubular frame member is limited. While forming an opening in the tubular frame member would present a solution to gaining access to the interior of the tubular member for the placement of reinforcements, the formation of such an opening would degrade the stiffness of the hydroformed frame member.

The placement of a striker reinforcement is one of the challenges created with the use of a hydroformed tubular member as the B-pillar of an automotive frame. The B-pillar carries the striker, which engages the latch mechanism carried by the door to secure the door in a closed orientation with respect to the automotive frame. The latch and striker are designed to work together to secure the door against the B-pillar, and prevent the door from inadvertently opening in the event of a crash, but is also designed to control squeaks and rattles, and door chucking. From an assembly standpoint, the striker and latch system will also provide the ability to set door position adjustment for fit and finish. Since the striker is set and adjusted from the door opening, attaching the striker to the door opening panel or to the body side panel would not provide sufficient strength to manage the loads required during the side impact or pull-out tests. Reinforcement is required to allow the striker and the striker reinforcement to sandwich the thin sheet metal body panel and distribute the load over a greater area. A typical striker reinforcement is a deformable plate attached to the inner side of the B-pillar.

The mounting of a striker in an open section, stamped B-pillar is shown in U.S. Pat. No. 6,126,410, issued to Hari Kosaraju, et al on Oct. 10, 2000. Similarly, the use of a positionable striker reinforcement member in an open section automotive frame member is disclosed in U. S. Patent Publication No. 2004/0042869 of Gary Tucker, published on Mar. 4, 2004. Furthermore, U.S. Patent Publication No. 2004/0119300 of Steven Strable, et al, published on Jun. 24, 2004, also discloses a striker reinforcement that is welded to the inside portion of an open section automotive frame member. A hydroformed B-pillar structure is shown in U.S. Patent Publication No. 2006/0273630 of Xiaoming Chen, et al, published on Dec. 7, 2006; however, the mounting of the striker reinforcement is not disclosed in this published patent application.

The placement of a striker reinforcement in a closed section frame member is depicted in U.S. Pat. No. 4,432,575, granted on Feb. 21, 1984, to Louis Garvey, et al, wherein the anchor plate is welded to the inside wall of the vehicle door lock pillar. Although the Garvey striker configuration is in conjunction with a closed section pillar, the pillar is formed from stamped, welded sections, rather than being hydroformed. Accordingly, the striker reinforcement has to be welded in placed before the pillar is formed into the closed section or access to the interior of the pillar is necessary to place the striker reinforcement on the interior of the pillar structure. A similar striker assembly is taught in U.S. Pat. No. 6,814,401, granted to Masahide Takada on Nov. 9, 2004, in which the reinforcement is placed on the interior of a closed section formed pillar that requires access to the interior in order to affix the striker reinforcement.

It would be desirable to provide a striker reinforcement plate and a method of installing the striker reinforcement plate into a closed section, hydroformed tubular frame member, such as the B-pillar of an automotive frame.

SUMMARY OF THE INVENTION

It is an object of this invention to overcome the aforementioned disadvantages of the known prior art by providing a striker reinforcement plate that can be installed into the interior of a closed section tubular frame member from the exterior side thereof.

It is another object of this invention to provide a method of installing a striker reinforcement plate onto the interior side of a closed section, hydroformed automotive frame member.

It is an advantage of this invention that the striker reinforcement plate can be installed through a slot formed into a hydroformed frame member.

It is a feature of this invention that the striker reinforcement plate is formed to fit through a slot formed into a hydroformed automotive frame member from the exterior of the frame member.

It is another feature of this invention that the striker reinforcement plate is formed with an enlarged tab to engage the exterior surface of the hydroformed tubular member to prevent the striker reinforcement plate from falling into the interior of the tubular member.

It is another advantage of this invention that the striker reinforcement plate can be welded to the hydroformed tubular member.

It is still another feature of this invention that the striker reinforcement plate includes a weld tab that is extended from inside the hydroformed tubular member through an opening in the tubular member to permit the weld tab to be welded to the exterior of the tubular member.

It is still another object of this invention to provide a method of installation of a striker reinforcement plate into the interior of a closed section, hydroformed tubular frame member including the steps of inserting the deformable striker reinforcement plate having an enlarged mounting tab through a slot formed into the tubular frame member, using the enlarged tab to prevent the striker reinforcement plate from passing completely into the interior of the tubular frame member, positioning a weld tab into an opening formed in the tubular frame member, and welding the weld tab to the exterior surface of the tubular frame member.

It is yet another feature of this invention that a mandrel engaging the bolt holes of the striker reinforcement plate can be used to secure the striker reinforcement plate in position for welding the mounting tab and the weld tab to the exterior surface of the tubular frame member.

It is still another advantage of this invention that a deformable striker reinforcement plate, simulating the known performance of conventional deformable striker reinforcement plates, can be utilized in a hydroformed tubular automotive frame construction.

It is yet another advantage of this invention that the striker can be mounted to the striker reinforcement plate in the same conventional manner as previously established in current automotive production.

It is a further object of this invention to provide a striker reinforcement plate for installation into a closed section, hydroformed tubular automotive frame member that is durable in construction, inexpensive of manufacture, carefree of maintenance, facile in assemblage, and simple and effective in use.

These and other objects, features and advantages are accomplished according to the instant invention by providing a striker reinforcement plate that is configured for installation into the interior of a closed section, hydroformed tubular automotive frame member. The striker reinforcement plate is formed with an enlarged mounting tab at one end and a weld tab at the opposing end. The striker reinforcement plate is inserted through a slot formed into the wall of the tubular frame member, against which the enlarged mounting tab prevents the striker reinforcement plate from falling through the slot, and the weld tab is inserted through a special formed opening to receive the weld tab. The weld tab can then be welded to the exterior surface of the tubular frame member, which combined with the enlarged mounting tab secured against the slot holds the striker reinforcement plate in place for final assembly of the striker. The striker can then be bolted to the reinforcement plate and be positionally adjusted in a conventional manner.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
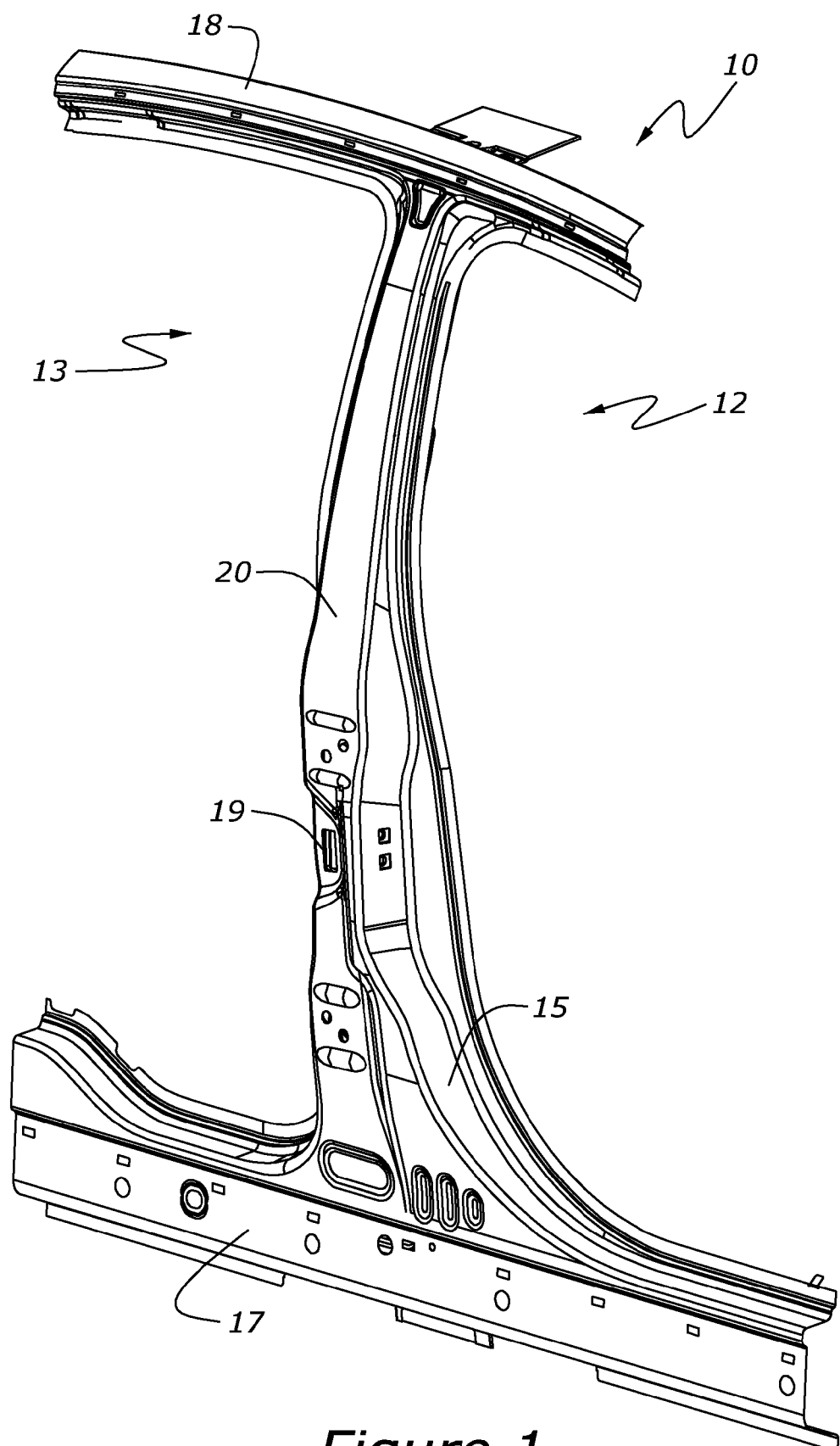
FIG. 1 is a partial perspective view of an automotive body structure to depict the B-pillar between front and rear door openings.
Figure 2:
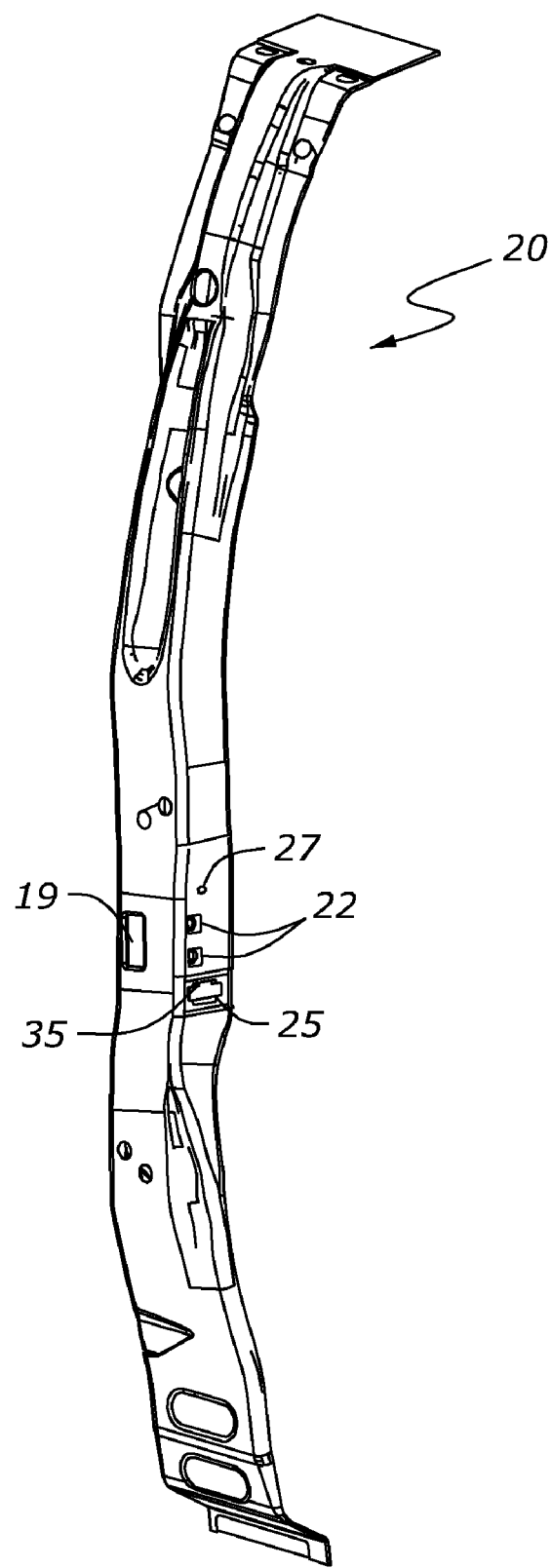
FIG. 2 is a perspective view of the of the B-pillar frame member forming the structural support of the automotive body structure depicted in FIG. 1.
Figure 3:
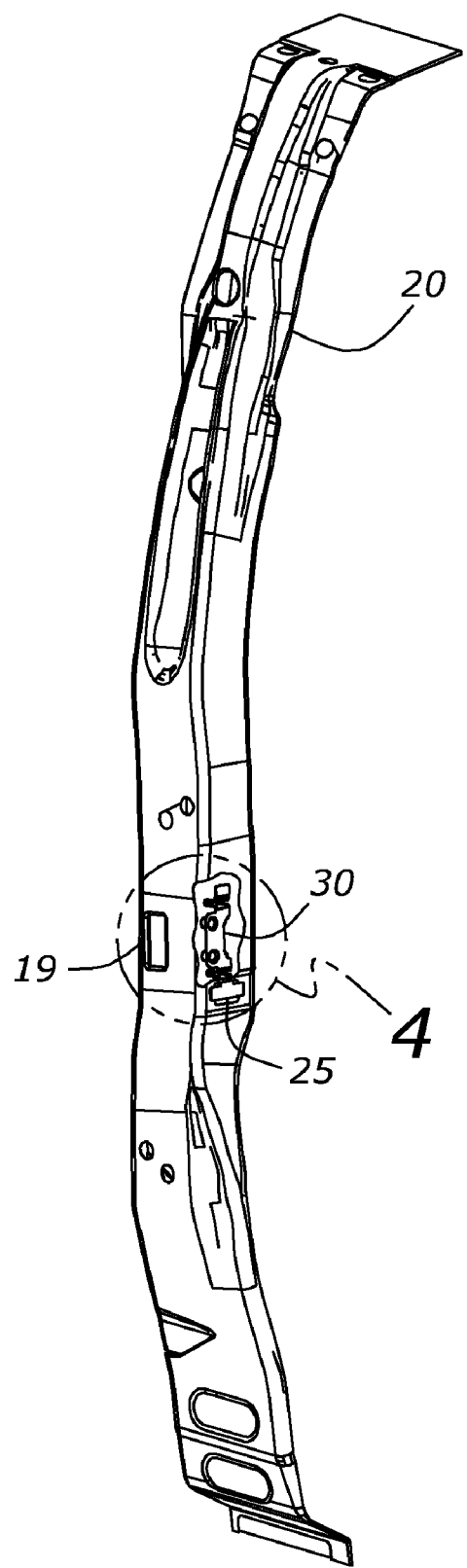
FIG. 3 is a perspective view of the B-pillar similar to that of FIG. 2, but having a portion broken away to show the striker reinforcement plate.

Referring to FIGS. 1-3, a portion of an automotive body structure at the B-pillar, which is found between the front and rear door openings of the automotive vehicle, incorporating the principles of the instant invention can best be seen. The automotive body structure 10 between the front door opening 12 and the rear door opening 13 includes a door opening panel 15 supported on a B-pillar 20 extending between a lower frame member or rocker 17 and an upper frame member or roof rail 18. The B-pillar 20 is formed from a tubular member through a hydroforming process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. Cutouts and other access openings are created by the form during the hydroforming process to provide openings for the passage of spot-welding electrodes and/or wiring access holes 19.

The B-pillar 20 carries the striker against which the door latching mechanism (not shown) engages to secure the door (not shown) in a closed position against the door opening panel 15, as will be recognized by one of ordinary skill in the art. The striker needs to be mounted into a striker reinforcement 30 carried on the interior side of the B-pillar 20 in order to spread the loads associated with the latching and securing of the door over a satisfactory area of the B-pillar 20.

Figure 4:
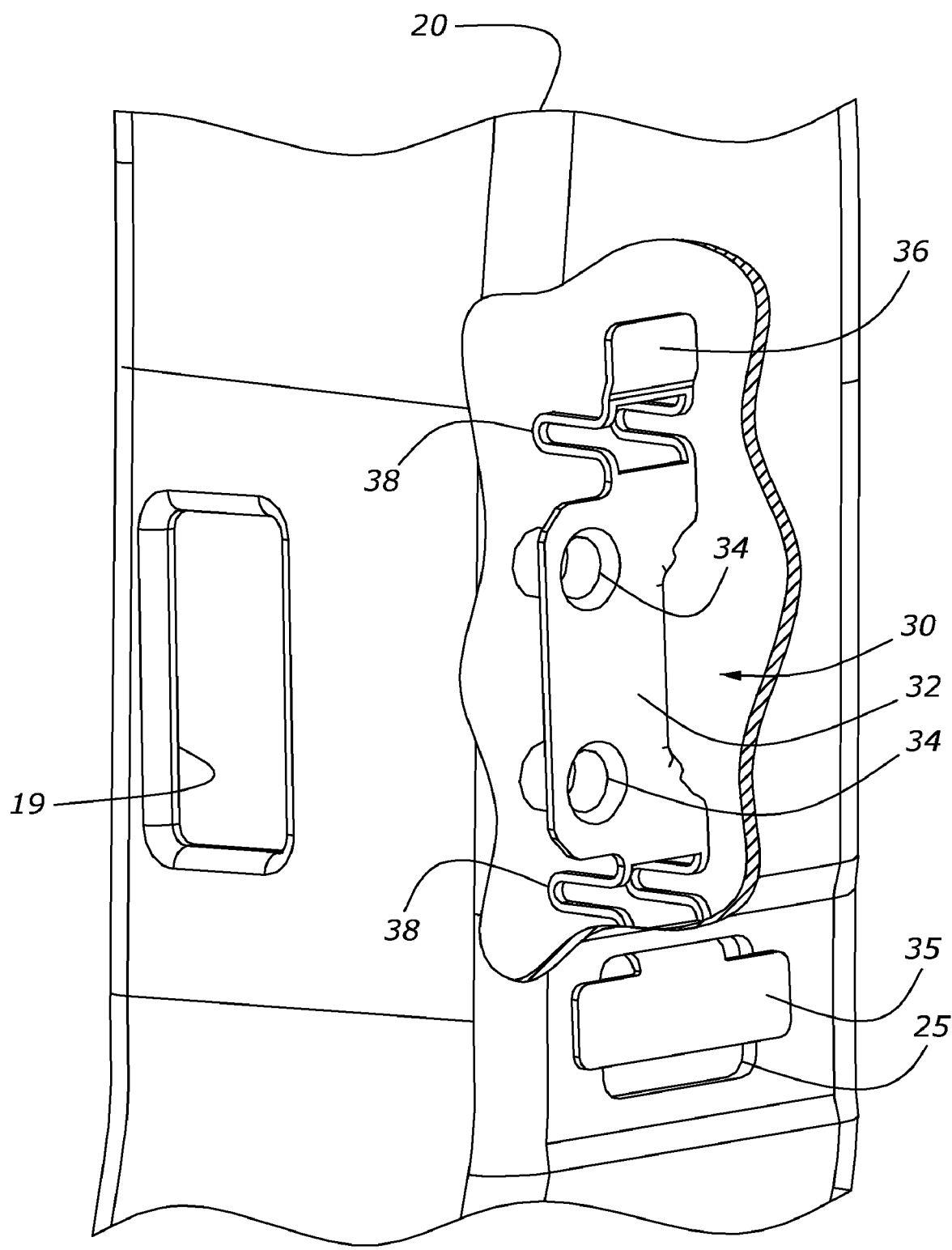
FIG. 4 is an enlarged perspective view of the portion of the B-pillar corresponding to the circle 4 shown in FIG. 3.
Figure 5:
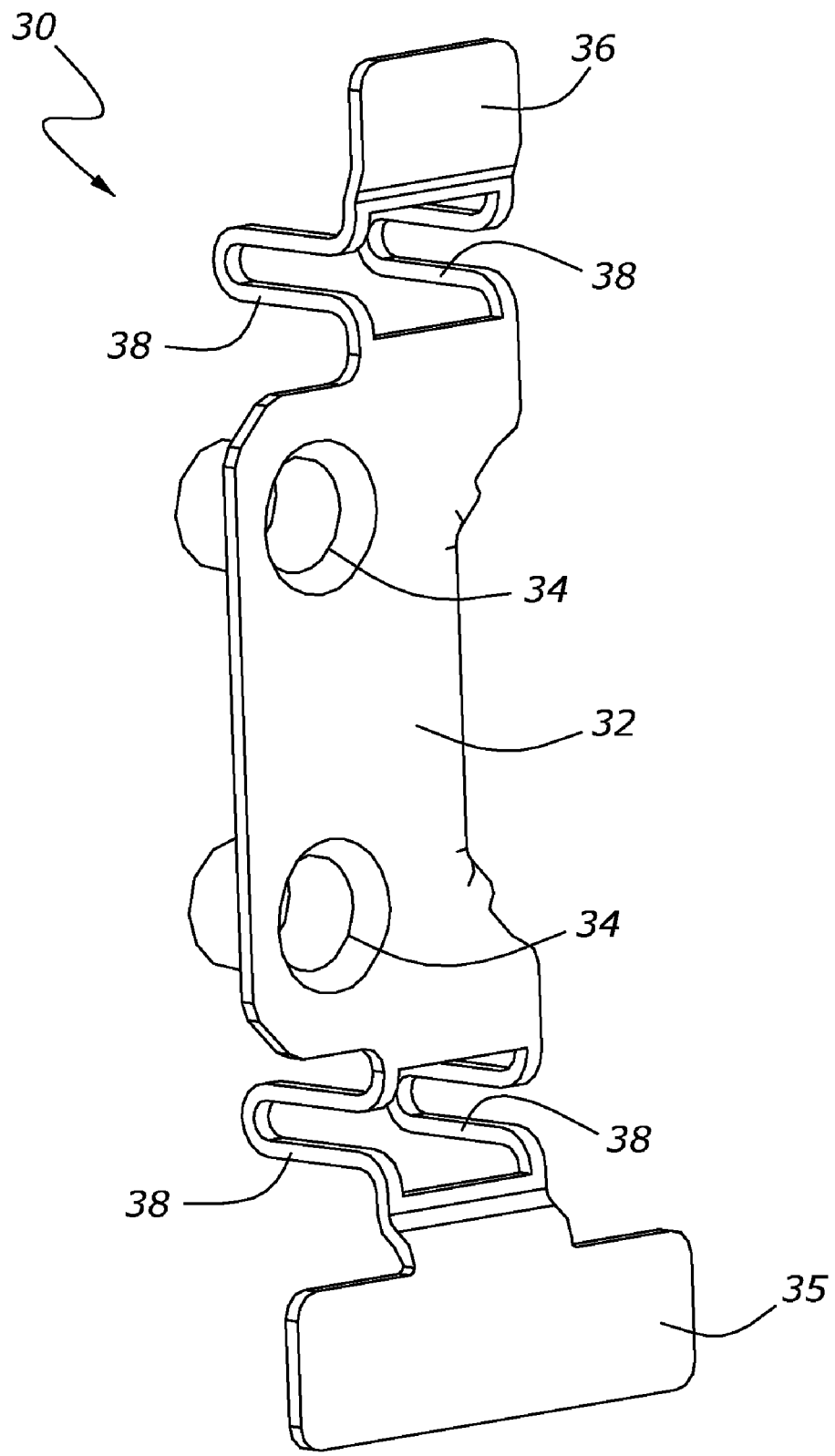
FIG. 5 is an enlarged perspective view of the striker reinforcement plate looking from the exterior side of the B-pillar.
Figure 6:
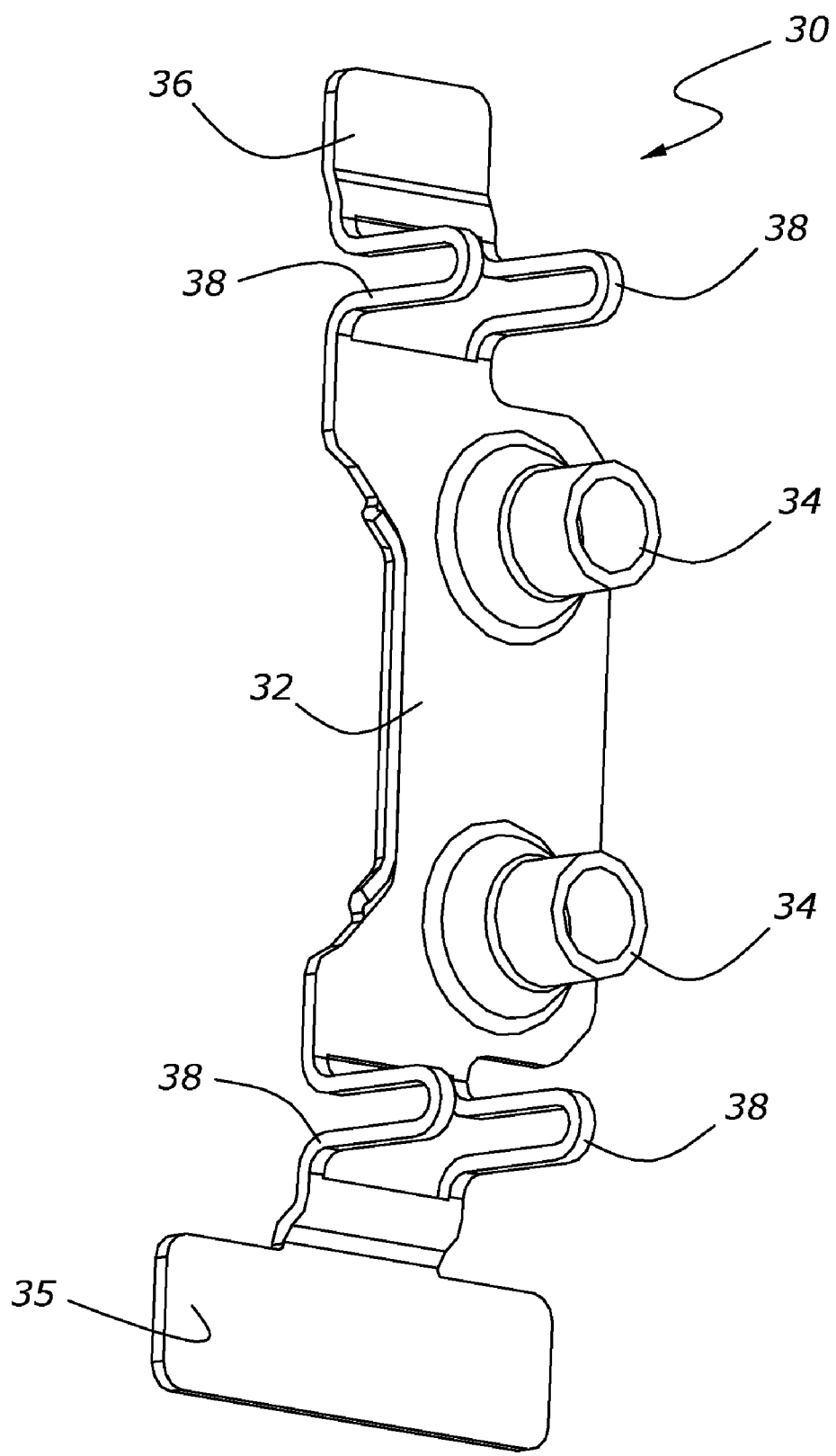
FIG. 6 is an enlarged perspective view of the striker reinforcement plate similar to that of FIG. 5, but looking from the interior side of the B-pillar.

As best seen in FIGS. 4-6, the striker reinforcement plate 30 is formed with a central portion 32 having a pair of vertically spaced mounting holes 34 therein. At one end of the reinforcement plate 30, a enlarged mounting tab 35 forms the terminus of the striker reinforcement plate 30 while a smaller weld tab 36 defines the opposing terminus. The central portion 32 is connected with the mounting tab 35 and the weld tab 36 by deformable strips 38 that permit the central portion 32 to be moved vertically and horizontally through deformation of the strips 38 so that the striker mounted to the central portion 32 by bolts passing through oversized holes 22 formed in the B-pillar 20 for the passage and movement of the bolts connecting the striker to the striker reinforcement plate 30.

The B-pillar 20 is also formed with a mounting slot 25 located below the oversized holes 22 and an engagement opening 27 above the oversized holes 22 for the receipt of the weld tab 36, as will be described in greater detail below. The size of the slot 25 will be sufficient to allow the passage of the central portion 32 of the striker reinforcement plate 30, which determined specifically by the design of the latching mechanism (not shown) associated with the door (not shown), so that the striker reinforcement plate 30 can slide through the mounting slot 25. The enlarged mounting tab 35, however, is then sized to prevent passage thereof through the mounting slot 25 so that the striker reinforcement plate cannot fall into the interior of the B-pillar 20. The size of the engagement opening 27 is sufficient to receive the weld tab 36.

As best seen in FIGS. 7A-7D, the installation of the striker reinforcement plate 30 can be accomplished through the steps of inserting the striker reinforcement plate 30 from the exterior of the B-pillar 20 through the mounting slot 25 directing the weld tab 36 toward the engagement opening 27. The enlarged mounting tab 35 will prevent the striker reinforcement plate 30 from passing through the mounting slot 25 and being lost internally of the B-pillar 20. This process of inserting the striker reinforcement plate 30 through the mounting slot 25 until the weld tab 36 is received within the engagement opening 27 is enhanced by inverting the B-pillar, which is reflected in FIGS. 7A-7C, so that gravity helps to move the weld tab 36 into position within the engagement opening 27. The striker reinforcement plate 30 can then be secured into position by a tool, such as mandrels, represented by the arrows 39 in FIG. 7C, until the weld tab 36 is welded, such as by MIG welding, to the exterior surface of the B-pillar. The welding of the weld tab 36 to the B-pillar 20 combined with the enlarged mounting tab 35 secures the striker reinforcement plate 30 in proper position.

Figure 7A:
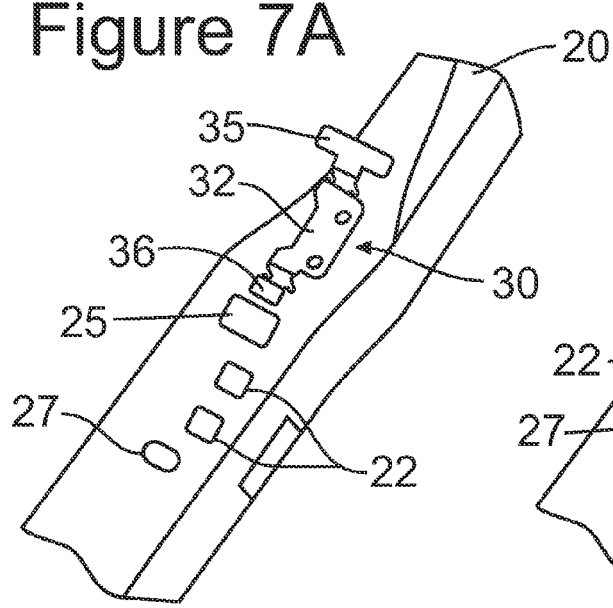
FIG. 7A is a schematic view of a portion of the B-pillar with the striker reinforcement plate being positioned to begin assembly.
Figure 7B:
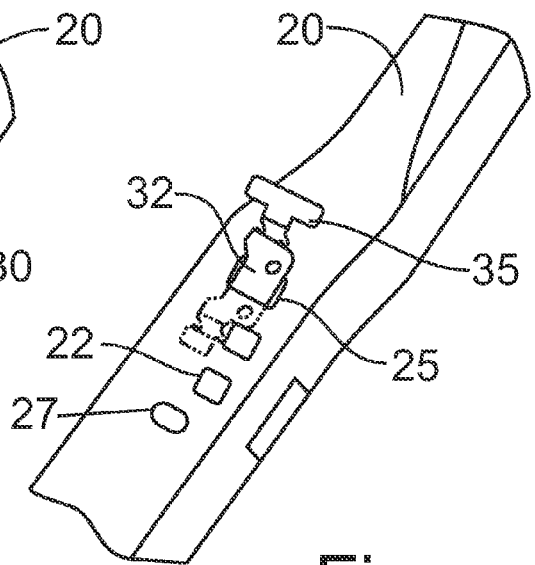
FIG. 7B is a schematic view similar to FIG. 7A but with the striker reinforcement plate being passed through the mounting slot into the interior of the B-pillar.
Figure 7C:
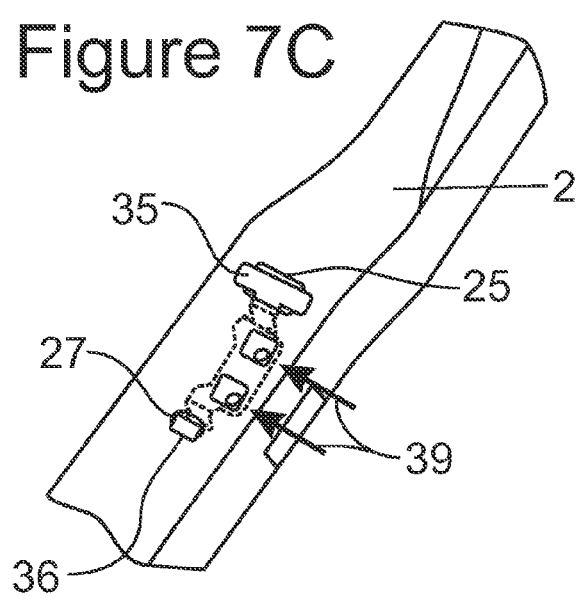
FIG. 7C is a schematic view similar to FIG. 7B but with the striker reinforcement plate positioned for the welding step, mandrels being schematically indicated by arrows to secure the striker reinforcement plate in position for welding.
Figure 7D:
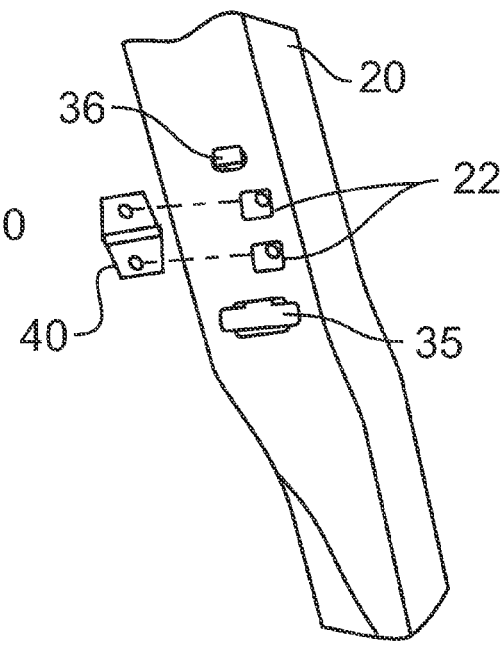
FIG. 7D is a schematic view similar to FIG. 7C but with the striker reinforcement plate being fully assembled and welded onto the B-pillar frame member.

One skilled in the art will then recognize that the striker 40, as indicated in FIG. 7D, can be mounted to the striker reinforcement plate 30 in a conventional manner with the bolts passing through the oversized holes 22 and engaging the mounting holes 34 in the central portion 32. Positional adjustment of the striker can then be accomplished by moving the central portion 32 horizontally and/or vertically as permitted by the deformable strips 38 and the limits imposed by the oversized holes 22. Once properly positioned, the bolts can be tightened to clamp the striker 40 and the striker reinforcement plate 30 on opposite sides of the wall of the B-pillar 20 to secure the striker 40 for operation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

The invention claimed is:

1. An automotive body structure comprising:
    a tubular frame member having an interior surface and an exterior surface and being formed with a pair of oversized holes, a mounting slot and an engagement opening; and
    a striker reinforcement plate mounted on the interior surface of said frame member and including:
        a central portion formed with a pair of vertically spaced mounting holes alignable with said oversized holes in said frame member;
        an enlarged mounting tab at one end of said striker reinforcement plate connected to said central portion by at least one first strip, said mounting tab being engagable with said mounting slot; and
        a weld tab at an opposing end of said striker reinforcement plate connected to said central portion by at least one second strip, said weld tab being received within said engagement opening.

2. The automotive body structure of claim 1 wherein said central portion is sized to pass through said mounting slot, said mounting tab having a size dimension that prevents said mounting tab from passing through said mounting slot.

3. The automotive body structure of claim 2 wherein said weld tab extends through said engagement opening to permit welding thereof to said exterior surface of said frame member.

4. The automotive body structure of claim 3 wherein said at least one first strip includes a pair of deformable strips interconnecting said mounting tab and said central portion, said at least one second strip including a pair of deformable strips interconnecting said weld tab and said central portion.

5. The automotive body structure of claim 4 wherein said central portion is movable relative to said mounting tab and said weld tab through deformation of said deformable strips to permit an adjustable positioning of said mounting holes relative to said oversized holes in said frame member.

6. The automotive body structure of claim 5 wherein said tubular frame member is formed through a hydroforming process.

7. The automotive body structure of claim 5 wherein said mounting slot is formed in said frame member below said oversized holes, said engagement opening being formed above said oversized holes.

8. The automotive body structure of claim 5 wherein said tubular frame member is a B-pillar of an automobile.

* * * * *